(12) United States Patent
Ben-Shachar et al.

(10) Patent No.: US 8,082,517 B2
(45) Date of Patent: Dec. 20, 2011

(54) APPLICATION SHARING VIEWER PRESENTATION

(75) Inventors: Ido M. Ben-Shachar, Sammamish, WA (US); Deana Rae Fuller, Seattle, WA (US); Ivan J. Leichtling, Redmond, WA (US); Robert W. Schmieder, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 230 days.

(21) Appl. No.: 11/869,792

(22) Filed: Oct. 10, 2007

(65) Prior Publication Data

US 2008/0034320 A1 Feb. 7, 2008

Related U.S. Application Data

(63) Continuation of application No. 10/153,501, filed on May 22, 2002, now Pat. No. 7,293,243.

(51) Int. Cl.
*G06F 3/00* (2006.01)
(52) U.S. Cl. ......... 715/781; 715/800; 715/803; 715/751
(58) Field of Classification Search .................. 715/751, 715/753, 755, 759, 800, 786
See application file for complete search history.

(56) References Cited

U.S. PATENT DOCUMENTS

| | | | | |
|---|---|---|---|---|
| 4,386,416 A | * | 5/1983 | Giltner et al. |
| 4,631,521 A | * | 12/1986 | El-Sherbini |
| 4,672,459 A | * | 6/1987 | Kudo |
| 4,677,649 A | * | 6/1987 | Kunishi et al. |
| 4,783,834 A | * | 11/1988 | Anderson et al. |
| 4,814,987 A | * | 3/1989 | Miyao et al. |
| 4,823,122 A | * | 4/1989 | Mann et al. |
| 4,882,687 A | * | 11/1989 | Gordon |
| 4,897,799 A | * | 1/1990 | Le Gall et al. |
| 4,965,677 A | * | 10/1990 | Pennebaker et al. |
| 4,974,173 A | * | 11/1990 | Stefik et al. |
| 5,008,853 A | | 4/1991 | Bly et al. |
| 5,057,916 A | * | 10/1991 | Krause et al. |
| 5,077,732 A | * | 12/1991 | Fischer et al. |
| RE33,894 E | * | 4/1992 | Bradley |
| 5,172,103 A | | 12/1992 | Kita et al. |
| 5,177,622 A | * | 1/1993 | Yoshida et al. |
| 5,179,711 A | * | 1/1993 | Vreeland |

(Continued)

FOREIGN PATENT DOCUMENTS

WO WO-99/26153 5/1999

OTHER PUBLICATIONS

IBM, IBM Technical Disclosure Bulletin Automatic Window Management Mode, vol. 35 No. 4B Sep. 1992.*

(Continued)

*Primary Examiner* — Ryan Pitaro
(74) *Attorney, Agent, or Firm* — Perkins Coie LLP

(57) ABSTRACT

An improved application sharing system and method are described wherein an application sharing viewing display is modified to increase the likelihood that a viewing user is able to see without scrolling the entirety of a window of interest displayed by a sharing user on a sharing machine. The scale of the viewer representation of the window of interest may be substantially continuously varied so as to best account for the particular size of the available display area at the viewing machine. In a further embodiment of the invention, the viewer's attention may be focused by filtering of the shared display material to visually enhance the current window of interest.

8 Claims, 9 Drawing Sheets

U.S. PATENT DOCUMENTS

| | | | |
|---|---|---|---|
| 5,206,934 A | * | 4/1993 | Naef, III |
| 5,210,825 A | * | 5/1993 | Kavaler |
| 5,241,625 A | * | 8/1993 | Epard et al. |
| 5,241,653 A | * | 8/1993 | Collins et al. |
| 5,255,361 A | * | 10/1993 | Callaway et al. |
| 5,287,203 A | * | 2/1994 | Namizuka |
| 5,298,992 A | * | 3/1994 | Pietras et al. |
| 5,319,463 A | * | 6/1994 | Hongu et al. |
| 5,390,262 A | * | 2/1995 | Pope |
| 5,404,436 A | * | 4/1995 | Hamilton |
| 5,408,600 A | * | 4/1995 | Garfinkel et al. |
| 5,485,559 A | * | 1/1996 | Sakaibara et al. |
| 5,491,780 A | * | 2/1996 | Fyles et al. |
| 5,550,968 A | * | 8/1996 | Miller et al. |
| 5,565,886 A | * | 10/1996 | Gibson |
| 5,608,872 A | * | 3/1997 | Schwartz et al. |
| 5,625,809 A | | 4/1997 | Dysart et al. |
| 5,649,104 A | * | 7/1997 | Carleton et al. |
| 5,655,152 A | * | 8/1997 | Ohnishi et al. |
| 5,673,371 A | * | 9/1997 | Koopman et al. |
| 5,699,524 A | * | 12/1997 | Ooishi et al. |
| 5,717,856 A | * | 2/1998 | Carleton et al. |
| 5,727,155 A | | 3/1998 | Dawson |
| 5,754,873 A | * | 5/1998 | Nolan |
| 5,758,110 A | * | 5/1998 | Boss et al. |
| 5,760,769 A | * | 6/1998 | Petrie |
| 5,781,732 A | * | 7/1998 | Adams |
| 5,815,151 A | | 9/1998 | Argiolas et al. |
| 5,826,051 A | | 10/1998 | Porter et al. |
| 5,831,872 A | * | 11/1998 | Pan et al. |
| 5,835,713 A | * | 11/1998 | FitzPatrick et al. |
| 5,841,420 A | | 11/1998 | Kaply et al. |
| 5,847,706 A | * | 12/1998 | Kingsley |
| 5,864,711 A | * | 1/1999 | Mairs et al. |
| 5,874,960 A | * | 2/1999 | Mairs et al. |
| 5,933,597 A | | 8/1999 | Hogan |
| 5,938,724 A | * | 8/1999 | Pommier et al. |
| 5,949,435 A | * | 9/1999 | Brock et al. |
| 5,986,655 A | * | 11/1999 | Chiu et al. |
| 5,995,096 A | | 11/1999 | Kitahara et al. |
| 6,008,804 A | * | 12/1999 | Pommier et al. |
| 6,025,871 A | | 2/2000 | Kantor et al. |
| 6,057,835 A | * | 5/2000 | Sato et al. |
| 6,167,433 A | | 12/2000 | Maples et al. |
| 6,212,547 B1 | * | 4/2001 | Ludwig et al. |
| 6,216,177 B1 | * | 4/2001 | Mairs |
| 6,219,044 B1 | * | 4/2001 | Ansberry et al. |
| 6,230,171 B1 | * | 5/2001 | Pacifici et al. |
| 6,271,839 B1 | | 8/2001 | Mairs et al. |
| 6,275,223 B1 | | 8/2001 | Hughes |
| 6,285,363 B1 | * | 9/2001 | Mairs et al. |
| 6,292,166 B1 | | 9/2001 | Palmer et al. |
| 6,304,928 B1 | * | 10/2001 | Mairs |
| 6,308,199 B1 | | 10/2001 | Katsurabayashi |
| 6,317,777 B1 | * | 11/2001 | Skarbo et al. |
| 6,329,984 B1 | | 12/2001 | Boss et al. |
| 6,342,906 B1 | * | 1/2002 | Kumar et al. |
| 6,343,313 B1 | * | 1/2002 | Salesky et al. |
| 6,343,316 B1 | | 1/2002 | Sakata et al. |
| 6,456,305 B1 | | 9/2002 | Qureshi et al. |
| 6,460,126 B1 | | 10/2002 | Spilo et al. |
| 6,564,246 B1 | | 5/2003 | Varma et al. |
| 6,570,590 B1 | * | 5/2003 | Dubrow et al. |
| 6,577,330 B1 | | 6/2003 | Tsuda et al. |
| 6,584,493 B1 | | 6/2003 | Butler |
| 6,601,087 B1 | | 7/2003 | Zhu et al. |
| 6,654,032 B1 | | 11/2003 | Zhu et al. |
| 6,687,878 B1 | | 2/2004 | Eintracht et al. |
| 6,697,846 B1 | | 2/2004 | Soltis |
| 6,760,048 B1 | | 7/2004 | Bates et al. |
| 6,823,514 B1 | | 11/2004 | Degenerato |
| 6,825,860 B1 | | 11/2004 | Hu et al. |
| 6,826,595 B1 | | 11/2004 | Barbash et al. |
| 6,833,844 B1 | * | 12/2004 | Shiota et al. |
| 6,859,928 B2 | | 2/2005 | Wright |
| 6,910,188 B2 | | 6/2005 | Keohane et al. |
| 6,911,987 B1 | * | 6/2005 | Mairs |
| 6,925,645 B2 | | 8/2005 | Zhu et al. |
| 6,973,627 B1 | | 12/2005 | Appling |
| 6,982,729 B1 | | 1/2006 | Lange et al. |
| 7,003,728 B2 | | 2/2006 | Berque |
| 7,028,266 B2 | | 4/2006 | Ben-Shachar et al. |
| 7,046,253 B2 | | 5/2006 | Long et al. |
| 7,088,871 B2 | | 8/2006 | Mairs et al. |
| 7,127,460 B2 | | 10/2006 | Nixon et al. |
| 7,293,243 B1 | | 11/2007 | Ben-Shachar et al. |
| 7,356,563 B1 | | 4/2008 | Leichtling et al. |
| 7,404,014 B2 | | 7/2008 | Mairs et al. |
| 7,414,638 B2 | | 8/2008 | Ben-Shachar et al. |
| 7,418,664 B2 | | 8/2008 | Ben-Shachar et al. |
| 7,451,181 B2 | | 11/2008 | Sasaki et al. |
| 7,487,457 B2 | | 2/2009 | Ben-Shachar et al. |
| 7,530,022 B2 | | 5/2009 | Ben-Shachar et al. |
| 7,595,798 B2 | | 9/2009 | Ben-Shachar et al. |
| 7,721,223 B2 | | 5/2010 | Ben-Shachar et al. |
| 2001/0000811 A1 | * | 5/2001 | May et al. |
| 2001/0004746 A1 | | 6/2001 | Wright |
| 2002/0010713 A1 | | 1/2002 | Egilsson |
| 2002/0026323 A1 | * | 2/2002 | Sakaguchi et al. ............ 705/1 |
| 2002/0065919 A1 | | 5/2002 | Taylor et al. |
| 2002/0075304 A1 | * | 6/2002 | Thompson et al. |
| 2002/0078088 A1 | | 6/2002 | Kuruoglu et al. |
| 2002/0095399 A1 | | 7/2002 | Devine et al. |
| 2002/0174181 A1 | * | 11/2002 | Wei |
| 2002/0184310 A1 | | 12/2002 | Traversat et al. |
| 2003/0028610 A1 | * | 2/2003 | Pearson |
| 2003/0085922 A1 | * | 5/2003 | Wei |
| 2003/0103088 A1 | * | 6/2003 | Dresti et al. |
| 2003/0137522 A1 | | 7/2003 | Kaasila et al. |
| 2003/0167339 A1 | * | 9/2003 | Zhu et al. |
| 2003/0189599 A1 | * | 10/2003 | Ben-Shachar et al. |
| 2003/0189601 A1 | * | 10/2003 | Ben-Shachar et al. |
| 2004/0024819 A1 | * | 2/2004 | Sasaki et al. |
| 2004/0066408 A1 | | 4/2004 | Meyers et al. |
| 2005/0024389 A1 | * | 2/2005 | Mairs et al. |
| 2005/0027896 A1 | * | 2/2005 | Mairs et al. |
| 2005/0033817 A1 | * | 2/2005 | Wei |
| 2005/0055306 A1 | * | 3/2005 | Miller et al. |
| 2005/0216847 A1 | * | 9/2005 | Zhu et al. |
| 2006/0136366 A1 | | 6/2006 | Ben-Shachar et al. |
| 2006/0136837 A1 | | 6/2006 | Ben-Shachar et al. |
| 2006/0190839 A1 | | 8/2006 | Ben-Shachar et al. |
| 2006/0288389 A1 | | 12/2006 | Deutscher et al. |
| 2008/0183817 A1 | * | 7/2008 | Baek et al. ............ 709/204 |

OTHER PUBLICATIONS

U.S. Appl. No. 10/164,686, filed Jun. 6, 2002, Leichtling et al.*
U.S. Appl. No. 10/127,951, filed Apr. 23, 2002, Schmieder et al.*
U.S. Appl. No. 10/859,640, filed Jun. 3, 2004, Mairs et al.*
http://www.microsoft.com/windows/netmeeting/.
Screen Dumps of Microsoft Word 2000, Jun. 10, 1999 (8 pages).
Intel Corporation, "Intel ProShare Personal Conferencing Software, Getting Started Guide," Intel Corporation, 1994, pp. 25-31.
"A Primer on the T.120 Series Standard," DataBeam Corporation, pp. 1-13, 1995.
Schroeder, Erica, "PictureTel Plans Low-Cost Video App Sharing," PC Week, vol. 11, No. 25, Jun. 27, 1994, pp. 1 & 171.
Schroeder, Erica, "Videoconferencing—Creative brings Mac package to Windows," Networking, PC Week, vol. 11, No. 25, Jun. 27, 1994, pp. 83 & 88.
Gutekunst, Thomas et al., "A Distributed and Policy-Free General-Purpose Shared Window System," Oct. 6, 1994, Feb. 1995 IEEE/ACM Transactions on Networking, 13 pages.
Hao, Ming, C. et al., "Collaborative Computing: A Multi-Client Multi-Server Environment," Hewlett-Packard Laboratories, ACM, Inc. 1995, pp. 206-213.

\* cited by examiner

APPLICATION SHARING VIEWER PRESENTATION

CROSS-REFERENCE TO RELATED APPLICATION(S)

This application is a continuation of U.S. patent application Ser. No. 10/153,501 entitled "APPLICATION SHARING VIEWER PRESENTATION," filed on May 22, 2002, which application is hereby incorporated by reference in its entirety.

TECHNICAL FIELD

This invention relates generally to the technology of application sharing and, more particularly, relates to a system and method for improving a viewer's experience during application sharing.

BACKGROUND OF THE INVENTION

As computers and computer networks become more pervasive in the home and workplace, many old methods for performing everyday tasks are being replaced or streamlined through the use of computer networking technology. For example, many employees are now able to have a virtual presence in their workplace by logging into a computer network maintained by their employer. One of the most striking developments in computer networking technology has been the advent of remote collaboration.

One of the oldest forms of processing data is the meeting or conference, whereby multiple individuals focus their attention on common subject matter to arrive at a joint decision, consensus, or product. Increasingly, such meetings are now taking place in a virtual manner over computer networks through the use of application sharing technologies. Such technologies enable a sharing user to share an application with various viewing users. The display produced by the application running on the sharer's computer is made available via a computer network to the viewers' computers. In some cases, the sharer may pass control of the application to a viewer, whereby the viewer's control inputs are then communicated back to the sharer's computer, where the actions associated with the inputs are executed, and the resulting changed display is shared back out to the viewers.

Although application sharing can play a critical role in maintaining or increasing productivity and cooperation, certain problems with current application sharing systems sometimes create a confusing user experience. For example, computer displays are available in a wide variety of sizes, making it likely that an application sharing sharer and an application sharing viewer will have screens of different sizes. That means that in some instances, a viewer may see on his screen less of an item than is being displayed on a sharing machine display. In such situations, typical application sharing technologies have provided a scrolling facility to the viewer to enable them to access all of the displayed material. However, scrolling in this manner may be distracting or cumbersome to the user and may hinder the success or effectiveness of the application sharing session. While some application sharing technologies have allowed scaling of the entire desktop of the sharer, this technique is extremely CPU intensive, scaling the desktop based on a simple ratio of desktop-sizes from sharer to viewer, often introducing more scaling than is required, and thus making small items difficult to read. Furthermore, no such technologies have enabled a substantially continuous scaling to provide better matching between disparate screen sizes.

A related problem pertains to the sharer's ability to keep the viewer's attention focused on a current document of interest, i.e. the document that the sharer is working in or focusing on. Unfortunately, typical application sharing technologies do not always effectively focus the viewer's attention on the current document of interest to the sharer. Accordingly, while the sharer focuses on one document, the viewer may actually be focused on another.

A system and method are needed whereby the viewer experience of application sharing is improved over prior systems when application sharing participants use different screen sizes, or when the application sharing session involves numerous items, only one of which is currently of interest.

SUMMARY OF THE INVENTION

A novel system and method are described for increasing the effectiveness and simplicity of application sharing. In an embodiment of the invention, a viewing display is modified to increase the likelihood that a viewing user is able to see, without scrolling, the entirety of a window of interest displayed by a sharing user on a sharing machine. The scale of the viewer representation of the window of interest may be substantially continuously varied so as to best account for the particular size of the available display area at the viewing machine. In a further embodiment of the invention, the viewer's attention is focused by filtering of the shared display material to visually emphasize the current item of interest by excluding other windows from the display. In this way, the viewer's current focus will generally coincide with the sharer's current focus as is generally desirable during application sharing. Other features and advantages of various embodiments of the invention will become apparent from the detailed description set forth hereinafter.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
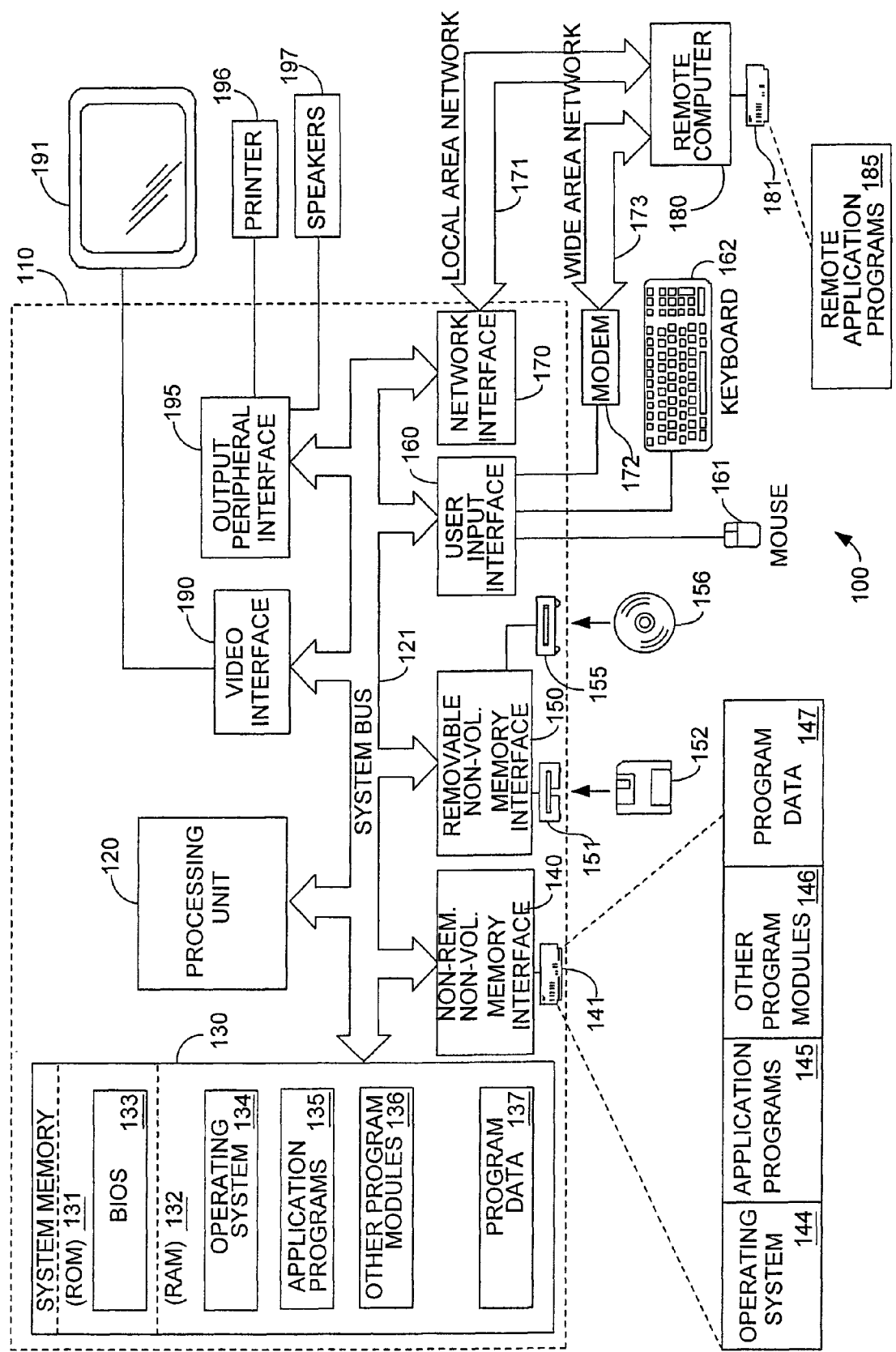
FIG. 1 is a block diagram generally illustrating an exemplary computer system usable in an implementation of an embodiment of the invention.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention is primarily for use in a networked environment and may further be practiced in distributed computing environments where tasks are performed by remote processing devices that are linked through a communications network. In a distributed computing environment, program modules may be located in both local and remote memory storage devices.

FIG. 1 illustrates an example of a suitable computing system environment 100 usable in an implementation of the invention. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that are suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

An exemplary system for implementing the invention includes a general-purpose computing device in the form of a computer 110. Components of the computer 110 generally include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example only, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example only, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110.

Communication media typically embodies computer readable instructions, data structures, program modules or other data in a modulated data signal such as a carrier wave or other transport mechanism and includes any information delivery media. The term "modulated data signal" means a signal that has one or more of its characteristics (such as, for example, voltage or current level, voltage or current pulse existence or nonexistence, voltage or current pulse width, voltage or current pulse spacing, etc.) set or changed in such a manner as to encode information in the signal. By way of example, and not limitation, communication media includes wired media such as a wired network or direct-wired connection, and wireless media such as acoustic, RF, infrared and other wireless media. Combinations of any of the above are also included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates RAM 132 as containing operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a keyboard 162, pointing device 161 (commonly referred to as a mouse), and trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

In the implementation of an embodiment of the invention, the computer 110 operates in a networked environment using logical connections to one or more remote computers, such as a remote computer 180. The remote computer 180 may be a personal computer, a router, a network PC, a peer device or other common network node, and in any case the remote computer or computers typically include many or all of the elements described above relative to the personal computer 110, although only a memory storage device 181 has been illustrated in FIG. 1. The logical connections depicted in FIG. 1 include a local area network (LAN) 171 and a wide area network (WAN) 173, but the computer 110 may additionally or alternatively use one or more other networking environments. Networking environments of all types are commonplace in offices, enterprise-wide computer networks, intranets and the Internet.

The computer 110 should include facilities for accessing the networks to which it is attachable. For example, when used in a LAN networking environment, the personal computer 110 is connected to the LAN 171 through a network interface or adapter 170. Another node on the LAN, such as a proxy server, may be further connected to a WAN such as the Internet. When used in a WAN networking environment, the computer 110 typically includes a modem 172 or other means for establishing communications directly or indirectly over the WAN 173, such as the Internet. The modem 172, which may be internal or external, may be connected to the system bus 121 via the user input interface 160, or other appropriate mechanism. In a networked environment, program modules depicted relative to the personal computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used. It is not intended to limit the invention to use in a hard-wired network environment, since it may also be used in transiently connected environments, such as for example a wholly or partially wireless network environment interconnected wholly or partially via optical, infrared, and/or radio frequency wireless connections.

Herein, the invention is described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
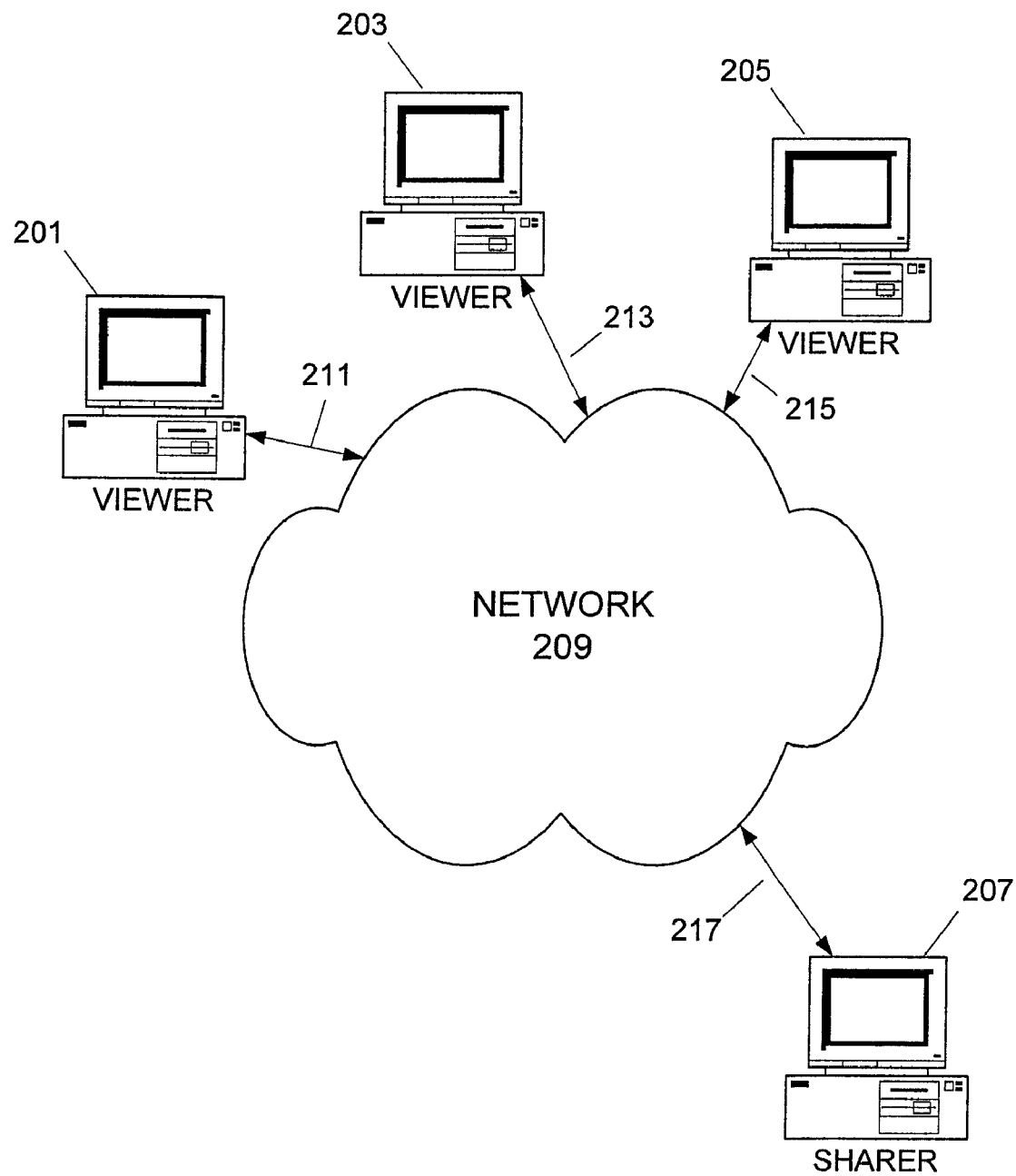
FIG. 2 is a schematic diagram showing the architecture of a network system within which an embodiment of the invention may be implemented, including multiple computers comprising a sharer computer and viewer computers.

FIG. 2 illustrates schematically a networking environment in which the present invention in preferably implemented. The architecture of such a system comprises one or more viewer computers illustrated as computers 201, 203, and 205, connected to a sharer computer 207 via a network 209. Each computer 201, 203, 205, 207 is connected or connectable to the network 209 and hence to the others of computers 201, 203, 205, 207 via network connections 211, 213, 215, and 217. The network connections 211, 213, 215, 217 and computers 201, 203, 205, 207 can be as discussed above more generally with respect to FIG. 1. The network may be of any type, including, for example, a LAN, such as found in an office, university or other setting, a WAN such as the Internet, a MAN, or any other tangible or intangible, fixed or transient mechanism for computer interconnectivity. While higher data transfer rates are generally preferable to lower data transfer rates, there is no limit or requirement as to the speed of the network 209. In addition, the network 209 may be a single network, or alternatively may be comprised of multiple networks of the same or different types and/or speeds. It will be understood that in many but not all cases, the network will further comprise routers, servers, and/or other computing devices in addition to the endpoint devices 201, 203, 205, 207 involved in the collaborative effort.

Figure 3:
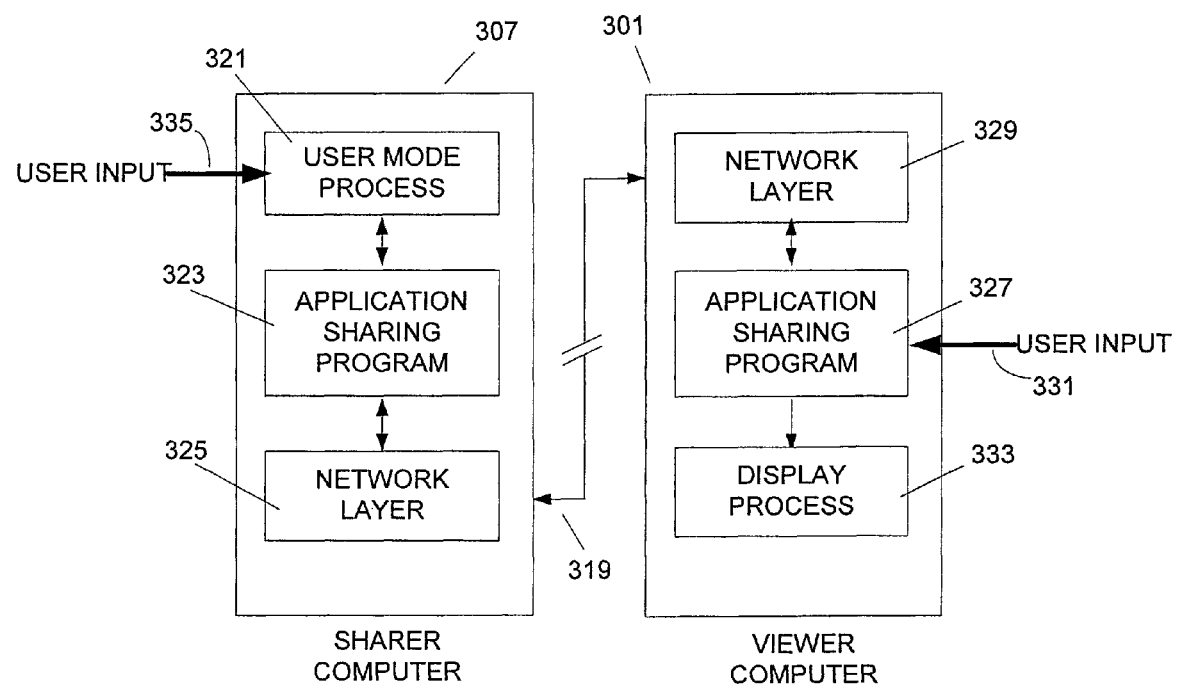
FIG. 3 is a schematic diagram illustrating in greater detail the placement and function of an application sharing program in an embodiment of the invention with respect to a sharer computer and a viewer computer.

Specific exemplary architectures of the sharer computer 207 and a viewer computer 201 are illustrated in greater detail schematically in FIG. 3. It will be understood that although only one viewer computer is illustrated in FIG. 3, there can be more than one such computer in an implementation of the invention, as illustrated by way of FIG. 2. Sharer computer 307 is illustrated as being connected via networking connection 319 to viewer computer 301. As will be appreciated by those of skill in the art, network connection 319 can include some or all of the network types and network connections discussed above, as well as other network types and connections alternatively or additionally.

One or more user mode processes of interest 321 are running on sharer computer 307. Such processes include processes, such as programs, from which information is being shared to one or more viewers such as viewer 307. The processes of interest 321 will be referred to hereinafter as shared processes, with the understanding that the information generated by the processes 321 need not be shared completely. That is, the information shared may consist of a subset of the information generated by such a process 321. Many shared process can also be used in a non-shared manner. For example, a word processing program may be used by the sharer for non-collaborative document production, and may then be used in a shared manner for group editing of the same or another document. In either mode, the processes 321 and the operating system of the sharer computer 307 perform certain steps. For example, whether or not the process 321 is shared, the output of the process 321 will still generally be output to the graphics display driver of the sharer computer 307.

If the application sharing program 323 is active, such as during a sharing session, then other processes unique to the collaborative setting also take place. In particular, the application sharing program 323, which is communicably linked to the process 321, receives information from the process 321 and transfers information to the process 321. Although the bi-directional flow of information between the process 321 and application sharing program is illustrated by a double arrow, note that the mechanisms for transfer may vary depending upon direction. For example, the process 321 need not even be aware of the presence or operation of the application sharing program 323 for the application sharing program 323 to receive information from the process 321.

Typically, the application sharing program 323 is communicably linked to an interceptor filter placed in the display path for the process 321. Such a filter may be placed just before the graphics device interface (GDI) or similar interface in such a manner as to read, in a non-intrusive manner, all information sent to the screen, such as monitor 191, of computer 307 by a shared process. In the WINDOWS operating system produced by MICROSOFT of Redmond, Wash., when an application is to display an object, it calls a GDI function and sends the various parameters for the object. In turn, the GDI sends commands to the screen, such as monitor 191, to cause it to display the object. In contrast, the mechanism for transferring information from the application sharing program 323 to the process 321 need not involve the display path at all, and may instead involve a direct transfer of information.

Regardless, the application sharing program 323 is also communicably linked to the networking facilities 325 of the sharer computer 307. Such facilities 325 may include any networking communications stack or other protocol arrangement as well as the hardware required for accessing the network connection 319, as discussed above with respect to FIG. 1. Across the network connection 319, a counterpart application sharing program 327 running on the viewer computer 301 is communicably linked to the sharer computer 307 via the network connection 319 and the networking facilities 329 of the viewer computer. The networking facilities 329 may be similar to the networking facilities 325 of the sharer computer. The counterpart application sharing program 327 receives input from shared process 321 via the network connection 319 and also potentially from a user of the viewer computer 301, via one or more input channels 331, such as a keyboard, mouse, etc. as discussed above with respect to FIG. 1. Additionally, the counterpart application sharing program 327 outputs material for display to a display process 333 such as a GDI or similar interface, or other display process for display on a screen, such as of a monitor 191. Note that the sharing computer also preferably includes input channels 335 such as those described above for receiving user input, some of which may be directed to and received by the process of interest 321.

The general operation of the architecture and components illustrated in FIG. 3 will be described briefly in overview before giving a detailed exposition of the processes involved in embodiments of the invention. Initially the shared process 321 is running on sharer machine 307, and is processing one or more documents or files. The user of the sharer machine 307 can begin execution of the application sharing program 323 by selecting an icon on the display screen of machine 307 or otherwise. Preferably, upon prompting by the user either via start-up of the application sharing program 321 or by selection of an option during execution of the application sharing program 321, the user of sharer machine 307 is presented with a list of all sharable documents currently open on machine 307, including those being processed by process 321. The user may select documents to be shared as well as a viewer with whom the documents will be shared.

The application sharing program 327 resident on the viewer machine 329 should be running before sharing of documents occurs, and may be run in the same manner as described above. At this point, document sharing may occur. That is, of all the documents selected as shared by the user of sharer machine 307, data corresponding to all or some shared windows is transmitted to the viewer computer 301 for display on the screen or display device of that computer 301 in an embodiment of the invention.

Having described the physical architecture of an application sharing system according to an embodiment of the invention, the interoperation of the various components to accomplish automatic screen size accommodation will now be described by way of an overview followed by a more detailed discussion of various functionalities within embodiments of the invention. A viewing computer such as computer 301 has a finite display size, such as on a monitor 191, for displaying a shared document. This finite display size typically will correspond to an application sharing window, which may cover substantially the entire viewer display when maximized. Some viewers will occupy much less than all of the computer's screen, even when maximized, due to other collaboration-related user-interface elements such as a chat application or general controls on the screen for application sharing (e.g., buttons, status displays such as a user roster, etc.) When the available viewing computer display area is less than the area that the sharer computer uses to display the shared document, it is desirable to automatically modify the scale of the shared document to ensure that in most cases the viewing user can see the entirety of the shared document without scrolling or otherwise scanning the viewing display. However, when such scaling would yield a viewer representation of the shared document that is unacceptably small, the viewer application sharing program no longer reduces the document size in an embodiment of the invention but instead provides scrolling functionality to allow at least some access to the entire document. In an embodiment of the invention, child windows of the shared document window are included in the document size prior to scaling such that the reduced representation of the shared document on the viewer display includes the entirety of the child window within the available viewing computer display area on the viewer machine.

The screen views of FIGS. 4-6 will be described in conjunction with the flow chart of FIG. 7 to provide a more detailed understanding of various embodiments of the invention. In step 701 of the flow chart of FIG. 7, the sharing computer 307 transmits a windows list to the viewer computer 301 via the connection 319 between them. The windows list, such as in a DT_WNDLST packet when using the WINDOWS brand operating system by MICROSOFT corporation of Redmond, Wash., contains enough information to allow the viewer computer 301 to reconstruct the shared portions of the sharing computer display. A windows list such as in a DT_WNDLST packet is sent by the sharer 307 to the viewer 301 anytime one or more windows on the sharer display move or change.

At step 703, the viewing computer 301 parses the received windows list to identify windows to be displayed to the viewing user. Although in some embodiments of the invention more than one shared window will be displayed to the viewing user, FIGS. 4-6 illustrate the case of a single primary displayed window with the understanding that the same inventive concepts may be applied to the display of more than one window that are not in a parent-child relationship.

The viewing computer 301 compares the size of the shared window to be displayed with the size of the available viewing area in step 705. Although the available viewing area will generally be a subset of the entire viewing computer viewing area, in the case where the application viewing window or area is maximized, its size may approximate the size of the entire viewing computer display area. If it is determined at step 707 that the size of the shared window does not exceed the available viewing area, then the process moves to step 709, whereat the shared window is displayed unscaled in its entirety within the available application sharing viewing area on the viewing computer 301.

If instead it is determined at step 707 that the size of the shared window exceeds the available viewing area at the viewing computer 301, then the process flows to step 711, at which point a scaling factor is calculated such that scaling of the shared window by the scaling factor would enable the entirety of the shared window to be displayed within the available viewing area. Subsequently at step 713, it is determined whether the scaling factor calculated in step 711 falls below 60%, that is, whether the scaled image resulting from application of the scaling factor to the shared window would be smaller than 60% of the size of the shared window. If the scaled image would be smaller than 60% of the size of the shared window, then the process moves to step 715, and displays the shared window in the available application sharing viewing area on the viewing computer 301 at 60% scale, with scroll bars provided for accessing portions of the document that are not currently visible.

Note that if the viewer has scrollbars up, and the viewing user scrolls over manually to a particular portion of the relevant material, such as at the right-most and lowermost position of the scrollbars, and then the sharer modifies the size of the shared application, the viewer's scrollbars may disappear if they are no longer needed. If the sharer then resizes the shared application again and causes the viewer to have scrollbars again, the scrolled position at the viewer is preferably, although not necessarily, set to the prior position, i.e. the rightmost and lowermost scrolled position. Alternatively, the newly scrollable display may be set to the leftmost and topmost position, as is often the default for scrollable displays, or any other suitable position.

Figure 4:
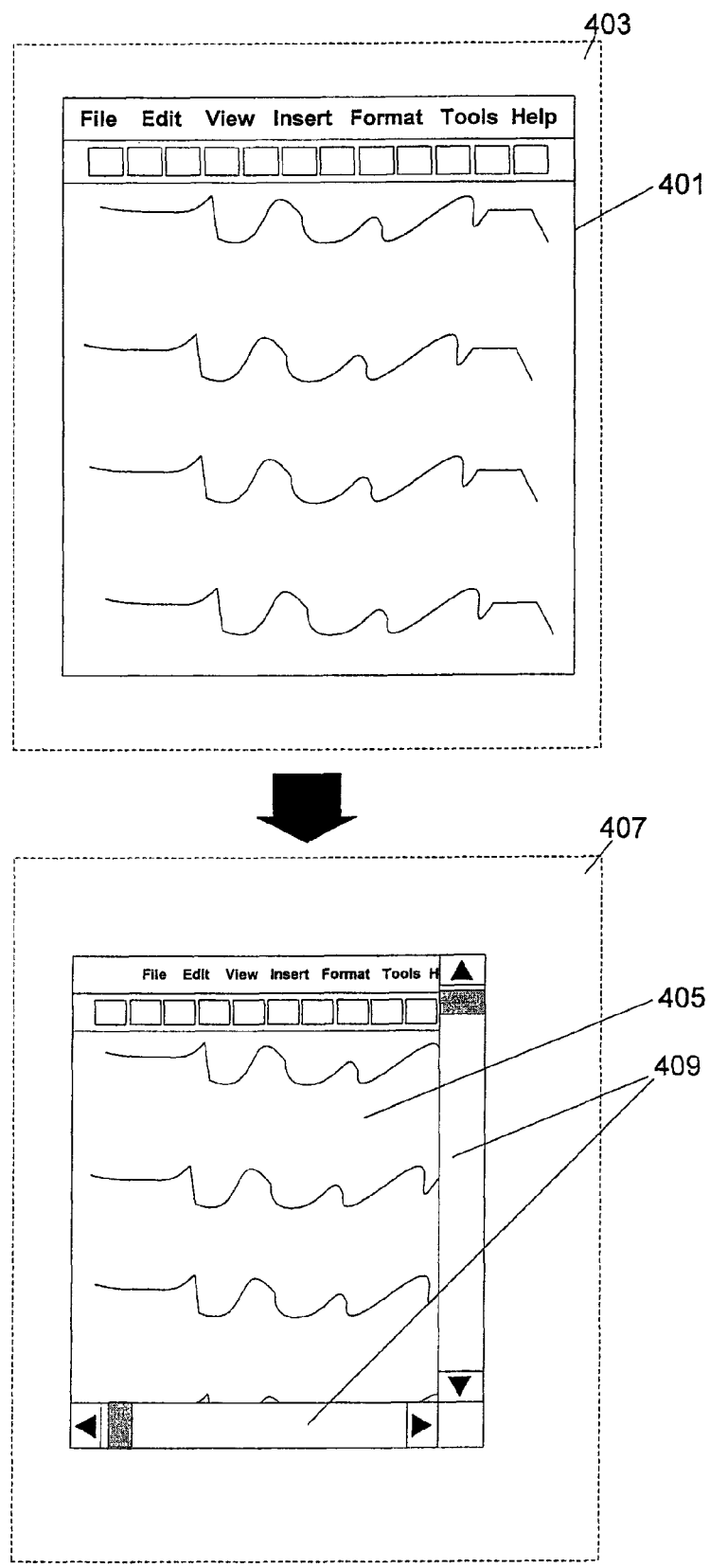
FIG. 4 illustrates simplified screen representations showing a sharing machine view of a shared document and a corresponding viewer display view of a shared document in the case where scrolling is utilized to account for disparate display area sizes.

FIG. 4 shows an exemplary sharing machine view of a shared document and a corresponding viewer display view of the shared document in the case where scrolling is utilized to account for disparate display area sizes. It can be seen that the contents of the shared window 401 on the sharer display 403 are not all visible within the available application sharing viewing area 405 on the viewer display 407. However, the scroll bars 409 may be used by the viewing user at any time to access portions of the shared window that are not visible.

The scroll bars 409 complicate the user interface somewhat, and raise the possibility that the portion of the document that is of interest to the sharer may not always be visible to the viewer without performing further actions. However, the benefit derived is that an image having English characters and scaled to 60% will still retain a great deal of readability. If scaling of the shared window to a very small size were permitted, the window contents may become unreadable or indecipherable. The invention does not require in every embodiment that scaling beyond a certain level be precluded, nor does it require that the threshold level for introducing scroll bars be 60%. Rather, it is contemplated that in some embodiments, scaling of any degree may be permitted, and that in embodiments where scaling is halted at a certain threshold percentage, that percentage may be any desirable percentage and need not be 60%. For example, language and font size may affect document readability and hence may affect the choice of the threshold percentage. Furthermore, certain types of materials, such as images, may retain their basic visual character under most commonly encountered scaling degrees, and as such there will be situations when scaling of any degree is permitted.

If it is instead determined at step 713 that the scaled image would still be equal to or larger than 60% of the size of the shared window, then at step 717 the process displays the shared window in the available application sharing viewing area on the viewing computer 301 at the scale calculated in step 711. In this case, the scroll bars are not needed by the viewing user since the entirety of the shared window is displayed.

Figure 5:
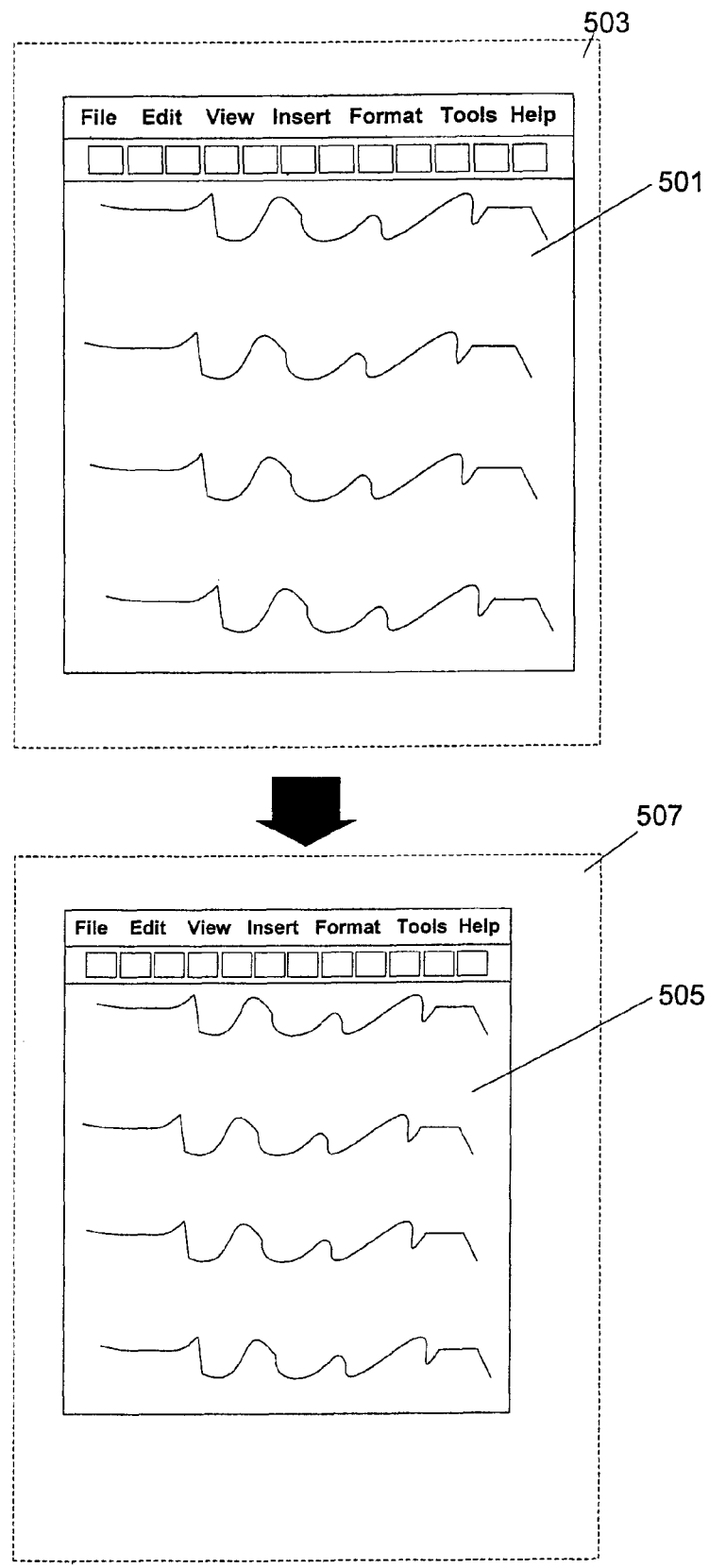
FIG. 5 illustrates simplified screen representations showing a sharing machine view of a shared document and a corresponding viewer display view of a shared document in the case where automatic zooming is utilized to account for disparate display area sizes.

FIG. 5 shows an exemplary sharing machine view of a shared document 501 and a corresponding viewer display view 505 of the shared document in the case where automatic zooming is utilized to account for disparate display area sizes without scroll bars, such as in step 717. It can be seen that although the shared window has been down-scaled, the contents of the shared window 501 on the sharer display 503 are entirely visible within the available application sharing viewing area 505 on the viewer display 507.

Figure 7:
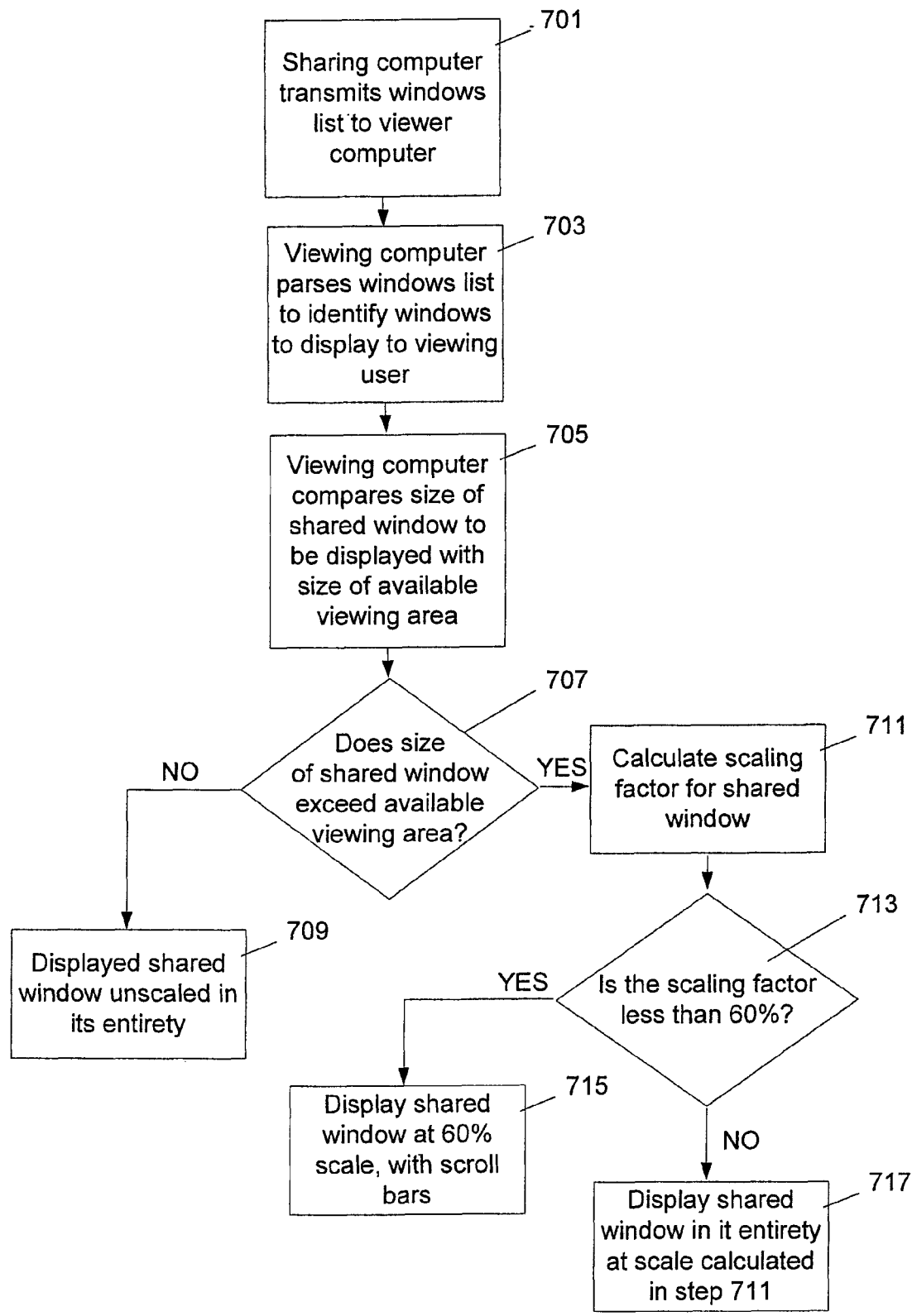
FIG. 7 is a flow chart describing the steps taken in an embodiment of the invention to construct a viewer representation of a shared window.

It will be understood that the process of FIG. 7 should preferably be repeated any time a new windows list is received at the viewer computer 301, in order to continuously determine the current best mode in which to display the shared window. Furthermore, it is contemplated that some users may have difficulty reading a document reduced to 60% of its original size, and thus the application sharing program at the viewing computer 301 is preferably user settable to change the threshold of the scaling of shared windows entirely, or even to cause up-scaling of such windows (although such could result in graininess and other image quality problems). In such cases, scroll bars are preferably used as is typical to account for disparate application sharing areas.

Some users will want to turn off scaling, especially users that have difficulty reading smaller fonts. Furthermore, tools such as WINDOW's brand "Magnifier" tool by MICROSOFT do not work as well on scaled bitmaps, so people who use such tools to read already small fonts should generally turn off scaling in order to achieve the best readability.

In some cases, the shared window as discussed in FIG. 7 is actually a collection of windows that are scaled together to maintain the readability of each and the relationship between the windows. Such is preferably the case, for example, when a child window of a shared window becomes visible on the sharer machine 307, such as by way of a pop-up or other similar window. In this case, it is desirable for the application sharing viewer to see both the shared window and its child window within the available application sharing viewing area on the viewing machine 301. Thus, the shared window and its child window are treated as a single entity for purposes of the calculations set forth above as will be discussed hereinafter.

Figure 6:
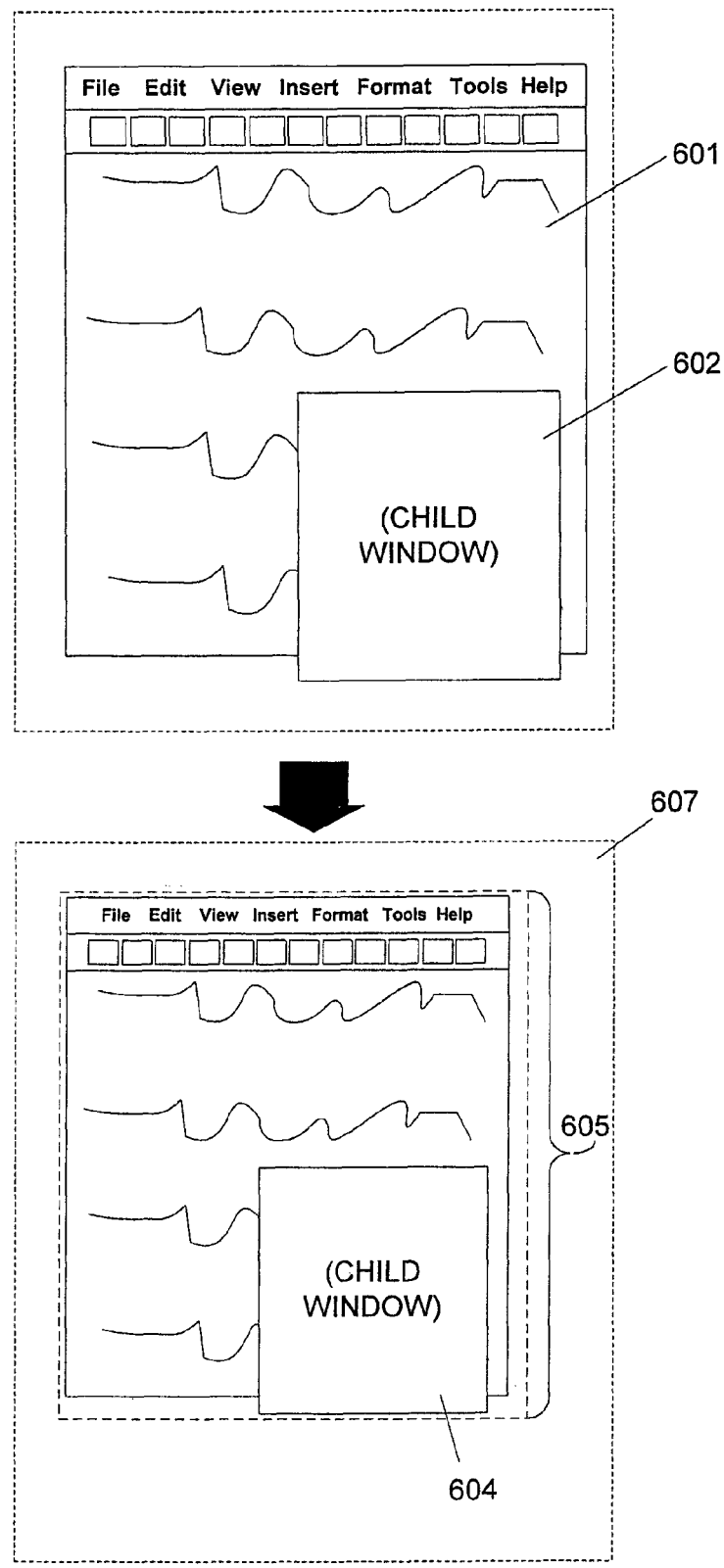
FIG. 6 illustrates simplified screen representations showing a sharing machine view of a shared document and a corresponding viewer display view of a shared document in the case where automatic zooming is utilized to account for disparate display area size and where a child window of the shared window extends beyond the original bounds of the shared window.

FIG. 6 shows an exemplary sharing machine view of a shared document and a corresponding viewer display view of a shared document in the case where automatic zooming is utilized to account for disparate display area size when a child window of the shared window extends beyond the original bounds of the shared window. In particular, it can be seen that the contents of the shared window 601 and its child window 602 on the sharer display 603 are visible within the available application sharing viewing area 605 on the viewer display 607. Preferably, the same criteria are applied to the union of the shared window 601 and its child window 602 as were applied to a shared window alone pursuant to FIG. 7. That is, the union may be scaled when needed, and scroll bars introduced when needed, and so forth, as described above with reference to FIG. 7.

The same principles discussed above with respect to FIG. 6 apply equally when it is desirable to share multiple windows, such as associated with a shared application, that are not in a parent-child relationship. Thus, it will be appreciated that the second or more of the windows to be viewed may be a dialog box, a tool tips box, a menu window, or another main window, or any other window type. Note that shared windows need not be touching or overlapping in the sharer display to be treated as a union, but it will appreciated that the closer the windows are to each other, the less downscaling will be needed to fit the union into a given viewer application sharing area.

Within the WINDOWS brand operating system by MICROSOFT, the StretchBlt( ) API is preferably used to move the image from the viewing machine's off screen bitmap to the scaled on-screen representation discussed above with respect to the drawing figures. In particular, to ensure the best quality in the scaled image, the SetStretchBltMode (HALFTONE) API may be used, although this API is computationally complex and thus utilizes greater system resources to execute. According to the SetStretchBltMode (HALFTONE) API, each pixel in the off screen bitmap is color-interpolated with the pixels around it, resulting in a more readable reduced on screen image.

In the past, application sharing programs have not provided a continuously variable scaling ability due to difficulty in avoiding cursor drift and other anomalies often associated with scaling. Thus, such systems typically supported only a finites set of scales. In an embodiment of the invention, a substantially continuous scaling ability is provided by utilizing a micro offset to avoid problems in scaling. As an example of the difficulty encountered, when control of a shared application is passed to the viewing user, and their view is scaled to something other than 100%, such as 70%, and they move their cursor in the shared application to a particular coordinate set, one of the application sharing programs, preferably the viewer's, must scale that coordinate set by 70% to know exactly which pixel should be associated with the cursor in the sharer's (100%) view. However, each pixel in the viewer's view corresponds to several pixels in the sharer's view due to the scaling. This means that the cursor will generally not be exactly positionable in the viewer's view in this situation. Within the WINDOWS brand operating system by MICROSOFT, this is not a very significant problem since WINDOWS typically provides matters that are larger than 1×1 pixel. Otherwise, cursor drift can happen because of the coordinate-translation. Thus, if the viewer moves their cursor over a particular point, then they are scaling that point to the sharer's coordinate system, and instructing the sharer machine to move the real mouse cursor to that point. If the sharer machine sends a message back to the viewer to synchronize the cursor position, the sharer machine may round that point to a slightly different point in the viewer's coordinate system. This may cause the viewer's cursor to be moved a pixel over, at which time the cycle begins again. The end result is that the viewer's cursor is seen to wander or drift across each screen. Accordingly, cursor coordinate translations should avoid this cycle, such as through the use of tolerances or offsets.

In an embodiment of the invention, the viewer is shown only a single document of interest at a time, in order to focus the viewer's attention on the same subject matter as that of the sharer. In particular, the viewer sees different documents appear in the same way that different channels produce different images on a TV, as opposed to the more traditional viewer experience of scanning and exploring a desktop to locate a current window of interest. Often in the traditional experience, out of band communications, such as by way of email or telephone are required to coordinate the attention of the share and the viewer. However, this can be distracting as well as wasteful of resources.

The window processing and display according to this embodiment will be described by reference to the illustration of FIG. 8 in conjunction with the flow chart of FIG. 9. The sharer display 803 in FIG. 8 displays multiple different windows. In particular, there are two shared windows 802, 804 belonging to a common first process, and a third shared window 808 belonging to different second process, as well as an unshared window 806 partially obscuring shared window 804. Shared window 804 is the current foreground shared window. If a non-shared window is the current foreground window, then shared window 804 is the most recent foreground shared window.

Figure 9:
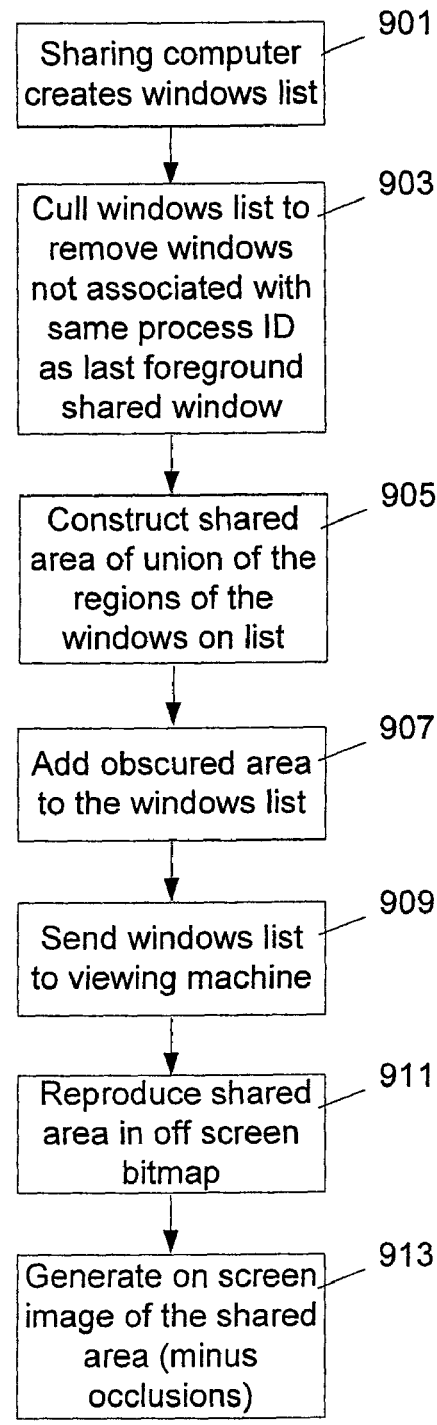
FIG. 9 is a flow chart describing the steps taken in an embodiment of the invention to filter a sharer display to produce a viewer display.

The processing of the displayed windows to facilitate application sharing begins at step 901 of FIG. 9 with the creation of a window list, created every time window position etc. changes, or whenever a new shared window becomes the last foreground shared window. The window list identifies each top-level shared window present on the sharer desktop. At step 903, prior to sending the window list to the viewer 301 in a DT_WNDLST packet, the windows list is culled to remove any window not associated with the same process ID (such as m_awcLastSharedActive) as the last foreground shared window. At this point, the windows list contains an identification of all top-level windows associated with the same process space as the current or latest foreground shared window. In step 905, a region is constructed consisting of the union of the regions of the windows on the list. This union region may be referred to as the shared area. Any window on the sharer desktop that intersects this area and which has a higher z-order than the window being intersected is obscuring the shared area. The area of intersection between the non-shared window and the intersected shared window may be referred to as the obscured area. Thus, in step 907, the obscured area is added to the windows list, which is then sent to the viewing machine 301 in step 909, such as via a DT_WNDLST packet.

Figure 8:
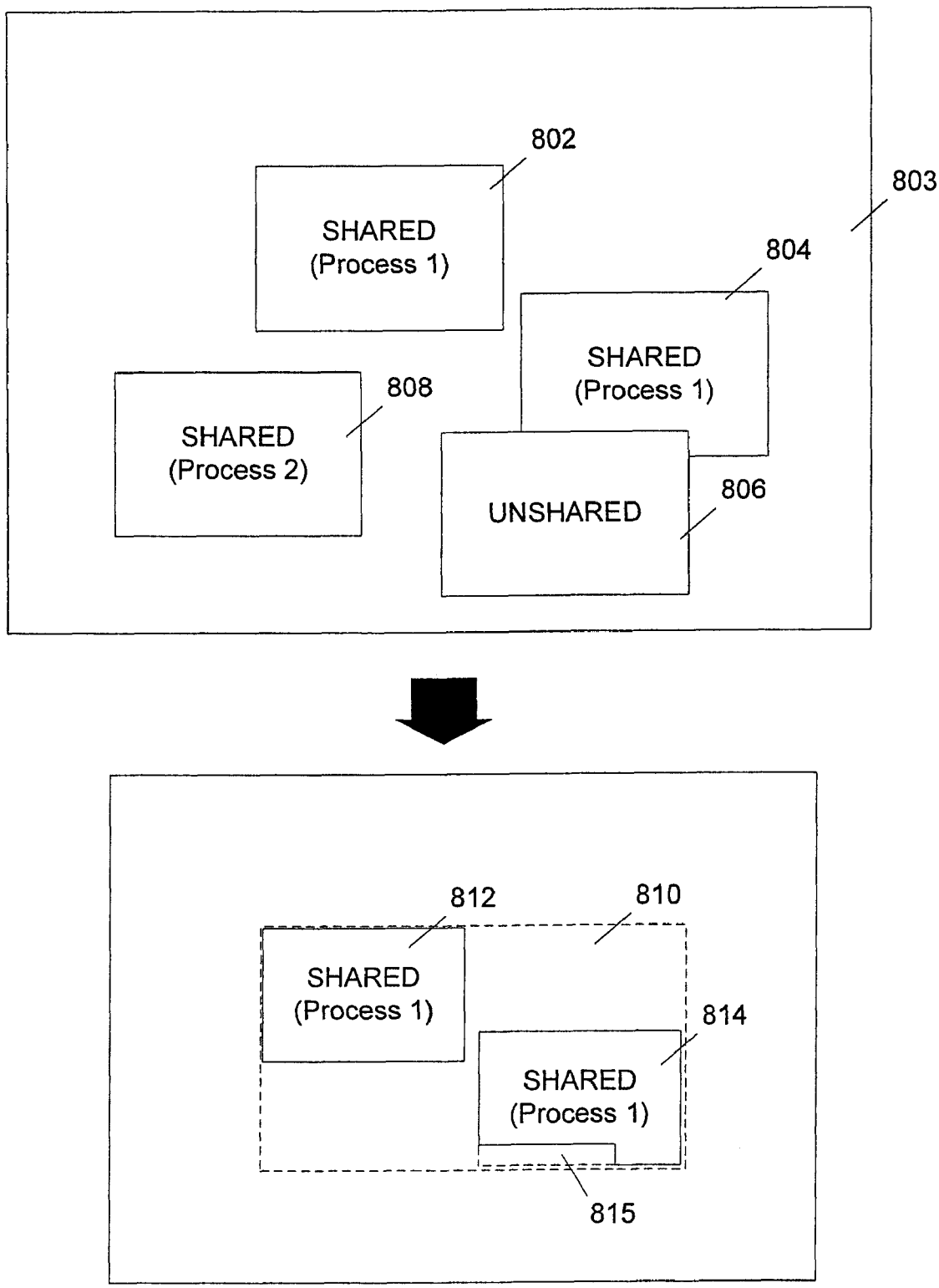
FIG. 8 illustrates simplified screen representations showing filtering of a sharer display to produce a viewer display.

Using the displayed windows of FIG. 8 as an example, the transmitted windows list would include windows 802 and 804 as these are shared, with 804 being the current or latest foreground window, but would not include window 808, which, although shared, does not share a common process with the current or latest foreground window. The windows list would also include an indication of the obscured area, such as by giving the extent and location of the obscuring window 806, even though window 806 is not a shared window.

From the received windows list, the application sharing program at the viewer computer 301 is able to construct a single window user model of the sharer's desktop. In particular, at step 911, the application sharing program at the viewing machine 301 reproduces the shared area in an off screen bitmap, and then in step 913 generates an on screen image 810 of the shared area, either by direct transfer or by scaling as discussed above. The on screen image includes representations 812, 814 of the shared windows 802 and 804, as obscured by window 806, represented by obscured area 815. The scaling may be accomplished by identifying a bounding box for the union of the shared window area less any obscured areas. The GetRgnBox( ) API may be used within the WINDOWS brand operating system to obtain such a bounding box. Note that the portions of the shared area that are obscured will not convey current window content, but the obscuration may be mitigated if desired, either by traditional means such as overlaid hatch marks, or by replicating an image subset to display in the obscured area.

In an embodiment of the invention, a visual indicator provides the sharing user with a prominent annotation highlighting the material that is currently visible to the viewing user. To this end, a visible highlight box surrounding the current top-level shared window and its related shared areas is created by the application sharing program on the sharing machine 307. The box is preferably a distinctly visible color such as a bright red, yellow or orange, of a thickness sufficient to be visible, but preferably not so thick as to substantially obscure other information on the sharing computer display or to overly distract the user. A thickness approximately the same as the thickness of a window frame on the display has been observed to be adequate.

The highlight box preferably lies just outside the bounds of the relevant shared window or windows, and is preferably not itself shared with the viewing user. It will be appreciated by those of skill in the art that there are a number of techniques available for creating the highlight box. For example, conglomerating four elongate windows, one for each side of the box, will create a highlight box that does not obscure the highlighted window or windows. These four windows should generally be higher in z-order than the shared window, regardless of whether or not they are transparent. Alternatively, the box may be created in an overlaid transparent window, although this method is computationally more expensive, and hence generally less desirable.

The automatic zoom display methodology discussed with respect to FIGS. 4-7 preferably cooperatively interacts with the single window interface model discussed with respect to FIGS. 8 and 9 to produce an intuitive and uncomplicated viewer experience. Using the combined techniques, the viewer is able to see the current document of interest to the sharer and is able in most cases to see the entirety of the document and related windows without scrolling or scanning. This experience is more akin to activities with which the viewer may be more comfortable, such as web surfing, than to traditional application sharing.

All of the references cited herein, including patents, patent applications, and publications, are hereby incorporated in their entireties by reference. That is, each and every part of every such reference is considered to be part of this disclosure, and therefore no part of any such reference is excluded by this statement or by any other statement in this disclosure from being a part of this disclosure.

In view of the many possible embodiments to which the principles of this invention may be applied, it should be recognized that the embodiments described herein with respect to the drawing figures are meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Furthermore, although network connections are illustrated herein as lines, no limitation should thereby be imparted to the invention. Network connections may be circuit-switched, packet-switched, or otherwise, and may be transient or permanent, hard-wired or wireless, operating via any suitable protocol. Also note that although embodiments of the invention have been described largely by reference to a sharing program that is separate from the shared process, the sharing program may not be a stand alone program, but may instead be an integral part of the shared process itself, or may be a DLL or other in-process entity.

Moreover, the exact values and percentages given in the above description are exemplary only, and may be varied without departing from the scope of the invention. It will understood that although the examples of FIGS. 3-9 refer to a sharer and a viewer computer, any number of viewers may be involved, and a viewer may become a sharer and a sharer may become a viewer without limitation.

Furthermore, references herein to application sharing are not meant to require that all windows or material displayed on a sharer display and associated with a particular application are shared or unshared. Rather, one or more windows associated with an application running on the sharer machine are preferably sharable without requiring the sharing of all windows associated with that instance of that application. Moreover, although the steps employed to construct a viewer display are discussed herein with reference to the application sharing program of the viewer computer, such steps may alternatively be executed in whole or in part at the sharer computer.

Therefore, the invention as described herein contemplates all such embodiments as may come within the scope of the following claims and equivalents thereof.

We claim:

1. A method of sharing a representation of a selected window set comprising one or more windows with a viewing user of a viewing machine comprising:

receiving a list comprising a description of the one or more windows in the selected window set, wherein the one or more windows include at least one shared window, wherein if the at least one shared window comprises a plurality of windows, the plurality of windows share a common process ID, wherein the list further comprises a description of one or more non-shared windows if the one or more non-shared windows obscure any portion of any shared window in the list, the list created from a list of sharable windows, wherein a sharable window is one that appears on a display of a sharing machine, and that a sharing user of the sharing machine has designated as sharable with a viewing user of a viewing machine, the list identifying a first window, a second window, and a third window, wherein the first window and the second window have a same process ID, but the third window has a different process ID, the list culled to remove any sharable window that does not have the same process ID as a last foreground sharable window, wherein the last foreground sharable window is the sharable window most recently in the foreground of the display of the sharing machine so that the third window is removed if it does not obscure the first window or the second window and is not removed if it obscures the first window or the second window, but the first window and the second window are not removed; and displaying to the viewing user a representation of the one or more windows in the selected window set to the extent the one or more windows are not obscured by the one or more non-shared windows.

2. The method according to claim 1, wherein the representation of the one or more windows in the selected window set is scaled down from the windows in the selected window set.

3. The method according to claim 2, wherein the scale by which the one or more windows in the selected window set is scaled down from the windows in the selected window set comprises a value of about sixty percent.

4. The method according to claim 2, wherein the amount by which the one or more windows in the selected window set is scaled down from the windows in the selected window set is determined based on a comparison of the size of the one or more windows in the selected window set to an available viewing area on the viewing machine.

5. A method of sharing a list of windows during an application session comprising:

creating a list of sharable windows, wherein a sharable window is one that appears on a display of a sharing machine, and that a sharing user of the sharing machine has designated as sharable with a viewing user of a viewing machine, the list identifying a first window, a second window, and a third window, wherein the first window and the second window have a same process ID, but the third window has a different process ID;

culling the list of sharable windows to remove any sharable window that does not have the same process ID as a last foreground sharable window, wherein the last foreground sharable window is the sharable window most recently in the foreground of the display of the sharing machine so that the third window is removed, but the first window and the second window are not removed;

augmenting the culled list with a description corresponding to any non-sharable window that obscures on the sharer display any portion of any window in the culled list; and transmitting the augmented list to the viewing machine.

6. The method according to claim 5, further comprising displaying on the display of the sharing machine an annotation highlighting at least a portion of the material currently displayed on the display of the sharing machine that is also represented in the augmented list.

7. The method according to claim 6, wherein the annotation highlighting the portion of the material currently displayed on the display of the sharing machine is a box encompassing the portion.

8. A computer-readable storage medium storing computer-executable instructions that, when executed, perform a method of sharing a representation of a selected window set comprising one or more windows with a viewing user of a viewing machine, the method comprising:

receiving a list comprising a description of the one or more windows in the selected window set, wherein the one or more windows include at least one shared window, wherein if the at least one shared window comprises a plurality of windows, the plurality of windows share a common process ID, and wherein the list further comprises a description of one or more non-shared windows if the one or more non-shared windows obscure any portion of any shared window in the list, the list created from a list of sharable windows, wherein a sharable window is one that appears on a display of a sharing machine, and that a sharing user of the sharing machine has designated as sharable with a viewing user of a viewing machine, the list identifying a first window, a second window, and a third window, wherein the first window and the second window have a same process ID, but the third window has a different process ID, the list culled to remove any sharable window that does not have the same process ID as a last foreground sharable window, wherein the last foreground sharable window is the sharable window most recently in the foreground of the display of the sharing machine so that the third window is removed if it does not obscure the first window or the second window and is not removed if it obscures the first window or the second window, but the first window and the second window are not removed; and displaying to the viewing user a representation of the one or more windows in the selected window set to the extent the one or more windows are not obscured by the one or more non-shared windows, wherein the representation of the one or more windows in the selected window set is scaled down by a value based on a comparison of a size of the one or more windows in the selected window set to an available viewing area on the viewing machine from the windows in the selected window set, wherein the first and second windows are displayed, but the third window is not displayed.

* * * * *